Oct. 28, 1930.   W. G. PRICE   1,779,639
HYDRAULIC BRAKE AND OPERATING MECHANISM
Original Filed July 8, 1926   5 Sheets-Sheet 2

INVENTOR
William Gunn Price
BY
Carl H. Crawford
ATTORNEY

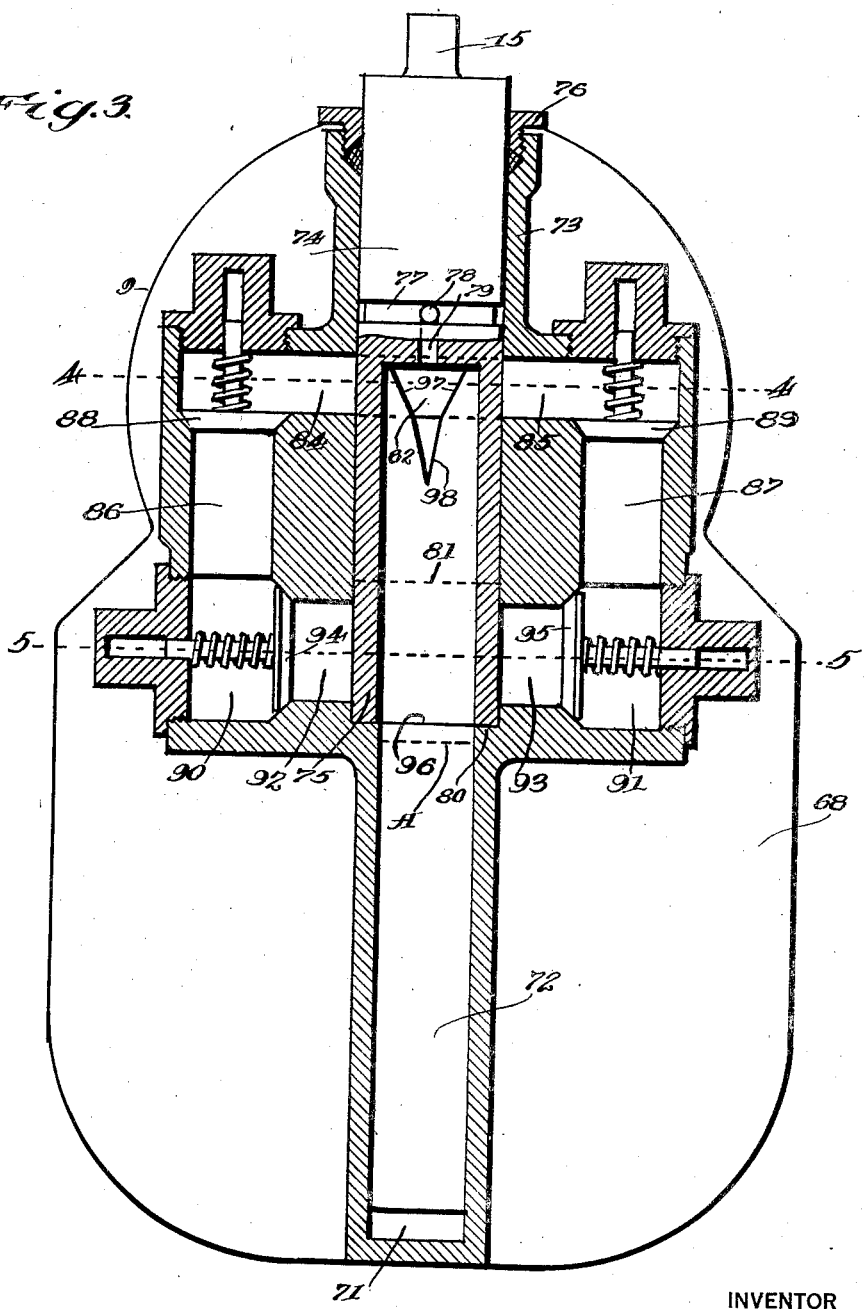

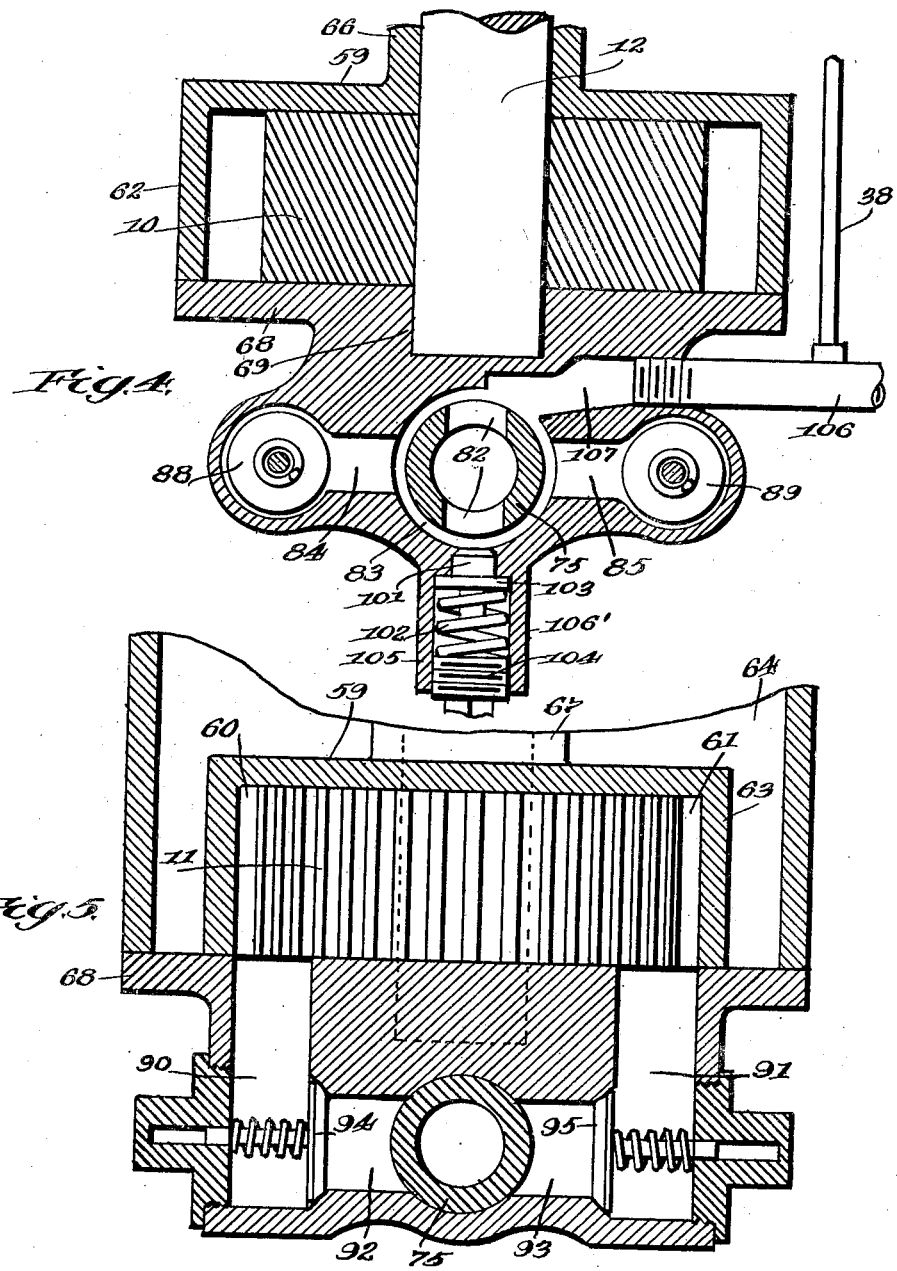

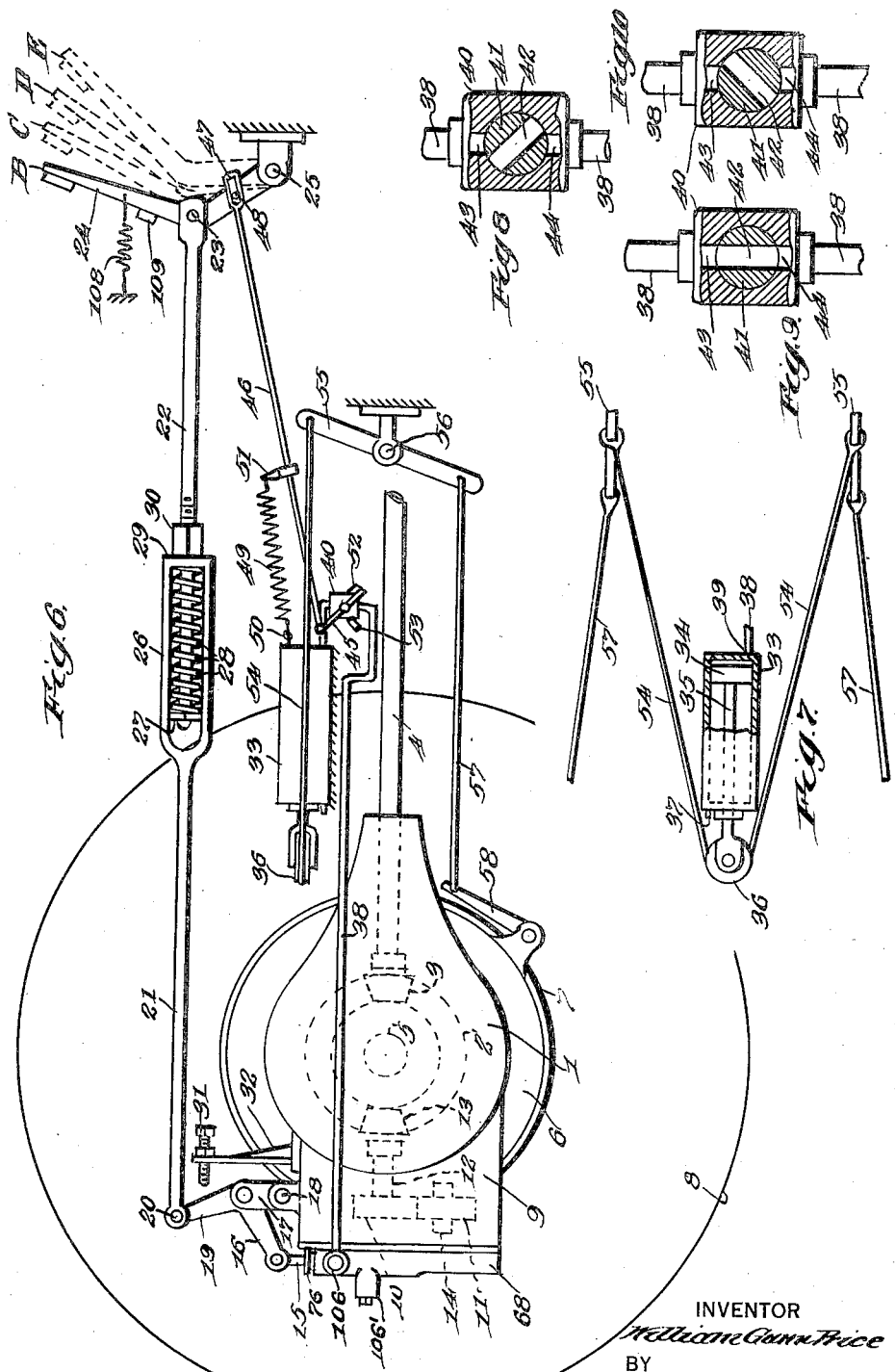

Patented Oct. 28, 1930

1,779,639

UNITED STATES PATENT OFFICE

WILLIAM GUNN PRICE, OF YAKIMA, WASHINGTON, ASSIGNOR TO McCLEARY HYDRAULIC BRAKE COMPANY, A CORPORATION OF WASHINGTON

HYDRAULIC BRAKE AND OPERATING MECHANISM

Application filed July 8, 1926, Serial No. 121,187. Renewed May 28, 1928.

The object of this invention is to provide an improved hydraulic brake and operating mechanism therefor.

It is a feature of my improved operating mechanism to provide means whereby manipulation of the usual foot treadle for the brake will serve to first apply the hydraulic brake and may subsequently apply the usual band brakes, these various functions being performed by movement of the treadle to various positions.

A further feature consists in the novel means whereby after the vehicle has been brought to a position of rest, the application of band brakage may be retained in a fully applied adjustment in a manner effectively to hold the vehicle in a test position.

A feature of my improved hydraulic brake consists in means whereby after a sustained application of brakage is effected, the pressure in said brake will be released before the brakage stress is sufficient to slide the wheels, and in the most improved form, this function is performed by by-passing the pressure medium from a congested to a non-congested area.

A further feature consists in providing opposed or oppositely disposed chambers between which vehicle driven gears mesh, the gears serving to suck or induce a flow of oil into either chamber, dependent upon the direction of rotation of said gears, and compress such oil in the remaining chamber, means being provided for freely permitting such induction or ingress and positively preventing egress through such admission channels.

A further object of the invention is to provide a novel form of controlling valve for governing egress of the oil from said chambers in a manner to impart braking stress to said gears.

A novel feature consists in connecting up both of the chambers with the controlling valve and providing novel means whereby only the congested chamber will be free to discharge to said valve and whereby the congested oil controlled by said valve will not be permitted to gain admission to that chamber which is functioning as the suction chamber.

My invention has many other objects and features which will be more fully described in connection with the accompanying drawings and which will be more particularly pointed out in and by the appended claims.

In the drawings:

Fig. 3, is a vertical sectional view on line 3—3 of Fig. 1.

Fig. 4, is a horizontal sectional view on line 4—4 of Fig. 3.

Fig. 5, is a horizontal sectional view on line 5—5 of Fig. 3.

Fig. 6, is a general view of a portion of a motor vehicle showing the device of my invention applied thereto.

Fig. 7, is a plan view showing the manner in which certain band brakes are connected up for operation by the device of my invention.

Fig. 8, is a sectional view of a band brake controlling valve in its normal position.

Fig. 9, is a view of said valve in an operation position.

Fig. 10, is a similar view of said valve in a brake retention position.

Like characters of reference designate similar parts throughout the different figures of the drawings.

Figure 1:
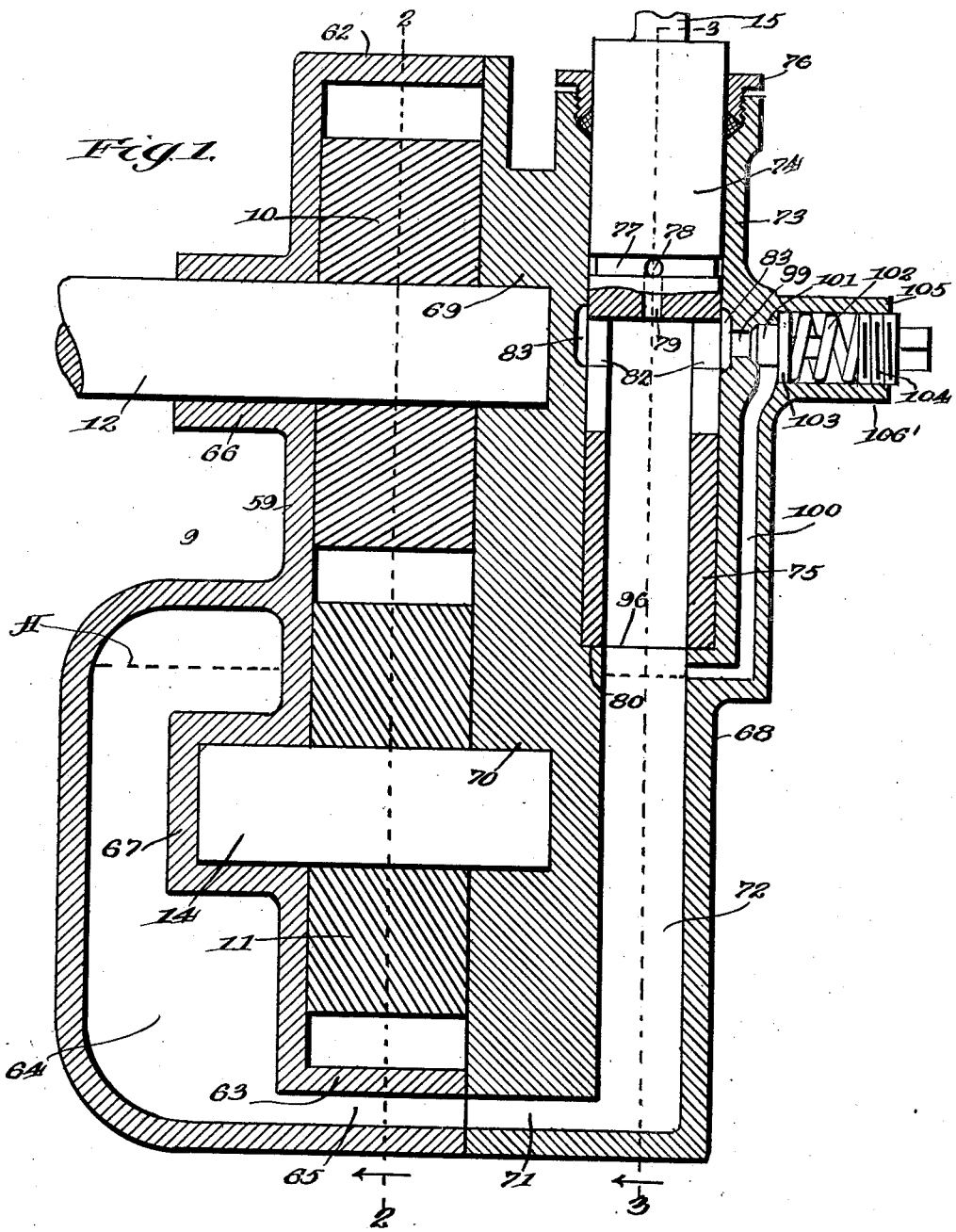
Fig. 1, is a vertical sectional view on line 1—1 of Fig. 2.

The operating mechanism for the hydraulic brake will first be described in detail, reference being had to Figs. 6 to 10, both inclusive.

The rear end, or differential is generally indicated at 1, the same including the ring gear 2 with which gear 3, on drive shaft 4, meshes. One of the axle sections is designated at 5, the band brake drum at 6, one of the band brakes at 7 and one of the rear wheels at 8. My improved hydraulic brake casing is shown mounted upon the rear of the differential casing 1, and is generally designated at 9. Within this casing 9, are vehicle driven gears 10 and 11, which will later be described in detail. Gear 10, is mounted on shaft 12, having a gear 13, which meshes with ring gear 2. Gear 11, is mounted on shaft 14. A controlling valve for the hydraulic brake is provided and the stem 15, is shown in Fig. 6, the same being pivoted to arm 16, of a bell crank lever which is floatingly mounted on a link 17, which is pivoted to casing 9, at 18. The remaining arm 19, of said bell crank lever is pivoted at 20, to one section 21, of an actuating rod, the remaining section being shown at 22, and the latter being pivoted at 23, to a foot treadle brake lever 24. Said treadle lever 24, is pivoted at 25, to swing about a fixed axis, as will be clear from Fig. 6. This actuating rod is shown extensible in the direction of its length, for a purpose which will later appear, and in the present form, I have equipped section 21, with a looped end 26, through which section 22 is slidable. Section 22, is provided with a spring abutment 27, and an expansively acting spring 28, is interposed between the looped end 29, and said abutment 27, and is placed under tension by a nut 30, threaded onto section 22.

An adjustable stop screw 31, is mounted on an arm 32, and functions to limit opening adjustment of valve stem 15, the arm 19, engaging said stop. Now in ordinary practice, the spring 28, will not be compressed when the valve 15 is opened, said spring being strong enough, and being under such initial tension as to cause the rod sections 21 and 22 to function as an in-extensible rod. However, when it is desired to actuated the band brakes, after the hydraulic brake has been actuated, the spring 28 yields, for further movement of treadle 24, after the stop 31 has arrested further movement of arm 19, as will later appear.

I will next describe the manner and means of actuating the band brakes.

What I will term a band brake cylinder is indicated at 33 and is suitably mounted in a fixed position as shown. Said cylinder has a piston 34, provided with a piston rod 35 which projects through one end of the cylinder and carries a sheave or pulley 36. The left hand end of said cylinder 33, viewing Fig. 7, is suitably vented at 37, to permit exhaust of air. Said cylinder 33, is in pressure connection with the hydraulic brake and I have shown a pipe 38 leading from casing 9, to the right hand end of cylinder 33, said pipe delivering to said cylinder at 39. A valve 40, is interposed in said pipe and the same is shown provided with a rotary plug 41, ported at 42. The casing of said valve has ports 43 and 44, which coact with port 42. Said plug 41, carries an arm 45, which is connected with a rod 46, the latter having lost motion connection with treadle 24, in the form of a slot and pin 47 and 48, respectively. A spring 49, connected with a fixed part at 50, and with said rod 46, at 51, normally retracts said rod and valve plug to the closed positions shown in Figs. 6 and 8. A stop 52, limits movement of said arm in one direction and a stop 53, limits movement of said arm 45 in another direction, whereby the plug 41 cannot oscillate in either direction beyond the positions shown in Figs. 6 and 10, both of said positions being closed positions. The lost motion connection is so arranged with treadle 24, that when the latter is in the rest position shown in full lines, the pin 48 will be at the left hand end of slot 47, thereby permitting movement of treadle 24, to the right of Fig. 6, for some distance before rod 46 is actuated, as will presently appear.

I will next describe the manner and means by which the piston rod 35, is hooked-up to actuate the band brakes.

A suitable cable 54 has its bight trained about sheave 36 and its ends connected to the upper ends of levers 55, pivoted at 56. The lower ends of said levers are connected by cables 57, with band brake actuating levers 58, only one being shown. When said levers 58, are moved in a clock-wise direction, the band brakes are applied. It will thus be seen that this is a form of equalizer which insures braking application of each brake band.

Before describing the operation of the mechanism just described, I will describe my improved hydraulic brake.

The casing 9 involves a gear or reservoir section 59, which is shaped to house the gears 10 and 11, as will be seen by reference to Figs. 1 and 3. Said section 59 is provided with opposed or oppositely disposed chambers 60 and 61 between which the gears 10 and 11 mesh, and as the gears closely fit walls 62 and 63, of the casing, and in addition, are closely housed on both sides, as shown in Fig. 1, it will be clear that as the gears rotate, they will transfer oil from one of said chambers to the other, dependent upon the direction of rotation of the gears. I have shown full line arrows to indicate the direction of rotation of the gears when the vehicle advances, and dotted arrows to show the direction when the vehicle is backing up. The gear section 59, includes a reservoir 64, in the lower portion of which is a passage 65, through which oil flows toward the chambers 60 and 61, as will presently appear. The shaft 12, is journalled in bearing 66 and shaft 14, in bearing 67, both of said bearings being shown formed in section 59. The right hand side of section 59, viewing Fig. 1, is closed by a valve section generally indicated at 68, which may be secured to said section 59 in any approved manner. As will be seen by reference to Fig. 1, the right hand ends of shafts 12 and 14, are journalled in section 68, as shown at 69 and 70. Said section 68, has an inlet passage 71, which registers with passage 65, to admit oil to an upwardly extending supply port 72, the lower portion of which is free and unobstructed and the upper portion of which is enlarged to form a controlling valve casing, as indicated at 73.

I will next describe my improved controlling valve and the valve controlled admission means for ingress of oil to chambers 60 and 61.

The improved controlling valve is indicated at 74, the upper portion being solid and the lower portion 75, being tubular. Said valve 74, is of the sliding type and I have shown a packing gland 76, near the top of casing 73. Said valve is also provided with a surplus oil collecting groove 77, having openings 78, adapted to deliver to a bore 79, which communicates with the tubular portion 75. Upward movement of said valve 74, is limited by stop 31, and downward movement is limited by shoulder 80, the extent of movement of said valve being indicated by dotted line 81, in Fig. 3. One of the novel features of said valve consists in one or more ports 82, two being shown in the present form. Said ports open to an egress chamber 83 which surrounds said valve and thereby equalizes pressure thereon so that the valve will not bind in its opening and closing movements. Said chamber 83 communicates with egress ports 84 and 85, which have downward extensions 86 and 87, respectively. Non-return valves, preferably spring closing, and designated at 88 and 89, are provided to permit ingress of oil to said chamber 83 and prevent egress of oil therefrom. Said extension ports 86 and 87 are in free communication with passages 90 and 91, which lead to chambers 60 and 61, respectively, as will be seen from Fig. 5. It will be noted that ports 84 and 85, and their respective extensions 86 and 87, are always egressing ports and are never ingressing ports. I have provided admission ports 92 and 93, which lead from the main supply port 72, to said passages 90 and 91, respectively. Interposed between port 92 and passage 90, and between port 93 and passage 91, are non-return valves 94 and 95, which are spring controlled and which are constructed and arranged to freely admit oil to passages 90 and 91 and prevent egress therefrom. Thus, ports 92 and 93, are always admission ports. These ports, as regards admission of oil thereto, are controlled by the lower end 96, of portion 75, of the controlling valve. When said valve is elevated so that the edge 96 uncovers ports 92 and 93, oil will be admitted thereto in proportion to the extent to which said valve 75 is elevated or moved toward an opening position.

At this point, and prior to a description of the operation, I desire to call attention to the fact that the openings or ports 82 have minor V-shaped portions 98 and maximum V-shaped portions 97, and that during the initial opening movement of the controlling valve, egress of oil will be restricted at a relatively slow rate whereas in the final opening movement where the portion 98 comes into play, the restriction of egress will very materially increase, with respect to the rate at which the valve is opened. Further, it is important to note that when the controlling valve is closed, as in Fig. 3, egress through openings 82 is fully open and free.

Reliance is placed upon the gears inducing a flow of oil to the chambers 60 or 61, in accordance with the direction of rotation of said gears.

I will next describe an important feature of my invention whereby pressure is released just prior to brakage being sufficient to slide the wheels, a sufficient factor of safety being eighty percent, as will later appear.

As shown more particularly in Figs. 1 and 4, I provide a safety port 99 which leads off from chamber 83, said port having an extension 100 which opens to supply port 72, below the closing end 96, of valve 74. A valve closure 101, urged by a spring 102, normally acts to close port 99. The spring 102 is shown interposed between a flange 103, on closure 101, and an adjustable plug 104 which is threaded into the hollow projection 105. It will thus be clear that the spring can be adjusted to the required tension so that the oil will be by-passed when the braking pressure has reached a predetermined extent, this being entirely independent of the will of the operator.

In case it is desired to apply brakage to a trailer, I have shown a pipe 106, which is connected as shown in Fig. 4, in a manner to receive congested oil from chamber 83, through a passage 107.

It may be stated that pipe 38, heretofore referred to in connection with Fig. 6, is also connected up with pipe 106, so that at any time oil is compressed in either chamber 60 or 61, such pressure will be available in pipe 38, for delivery to cylinder 33, so that band brakage can be applied, in an emergency, either when the vehicle is advancing or backing up.

I have shown the oil level at line A.

The operation of the structure shown in Fig. 6, will next be described.

With the parts in the position shown in Fig. 6, both the hydraulic and band brakes are inactive. Assuming that the driver wished to apply brakage, he would advance lever 24, to any desired extent dependent upon the amount of brakage he wanted, moving arm 19 to any position between that shown, and stop 31. This would render the hydraulic brake effective and would not actuate the band brake, and this is the usual service application that would be made. When the lever 24, is at position B, it is at a rest or inactive position and when advanced to position C, arm 19 will engage stop 31 and the hydraulic brake will exert its maximum power which will be limited to substantially eighty percent of what is required to slide the vehicle wheels, or any other factor of safety that may be thought desirable, or necessary. This limitation is positively fixed by the relief valve heretofore described and generally indicated at 106'. When the lever 24 has been advanced to position C, the valve 40, is still in the normally closed position shown in Fig. 8, because the pin 48, has not reached the right hand end of slot 47.

Assuming that the driver wanted additional brakage, he would advance lever 24, to position D, thereby advancing pin 48 far enough to take up the lost motion and also move rod 46, against the action of spring 49, and shift valve 40, into the open position shown in Fig. 9. This would admit oil under pressure from pipe 38, into cylinder 33, actuating the piston 34, to move the latter to the left of Fig. 6, thereby actuating levers 58, through the cables 57 and 54, and levers 55, as heretofore described. This would result in applying the band brakes, in addition to, and simultaneously with the sustained application of hydraulic brakage through the differential. Thus, it will be now clear, that band brakage can only be applied, after the hydraulic brake has been applied, and while such hydraulic brakage is effective. Now assume that the vehicle had been brought to a position of rest, and the driver wanted to employ both characters of brakes to maintain the vehicle in such position, he would then advance the lever 24, to position E, and that would move valve 40, to the position shown in Fig. 10, thereby locking the oil back of piston 34, so that the band brakes could not be released. It will be clear that spring 28, does not function during movement of lever 24 from position B to position C, but that it will yield to permit lever 24 to be advanced to either positon D or E. Thus, spring 28, always acts to restore the parts in a manner to release the band brakes, and further, resists application of the band brakes. A spring 108, may be employed to return lever 24 to a rest position against a suitable stop 109, and spring 49, will return valve 40, to the rest position shown in Fig. 8. I have not shown any form of ratchet or like retaining means to maintain lever 24, in any of the illustrated adjustments as that is a mere matter of mechanical skill.

As will be more clearly understood in the following description of the hydraulic brake, the adjustments just described will be effective to perform the functions noted, either as regards forward or backward movement of the vehicle, by reason of the fact that pipe 38, is connected for communication with both chamber 60 and 61. Hence, it will be seen that I can apply both characters of brakage to the vehicle, irrespective of the direction in which it is travelling, which I regard as a novel feature.

I will next describe my hydraulic brake operation.

Figure 2:
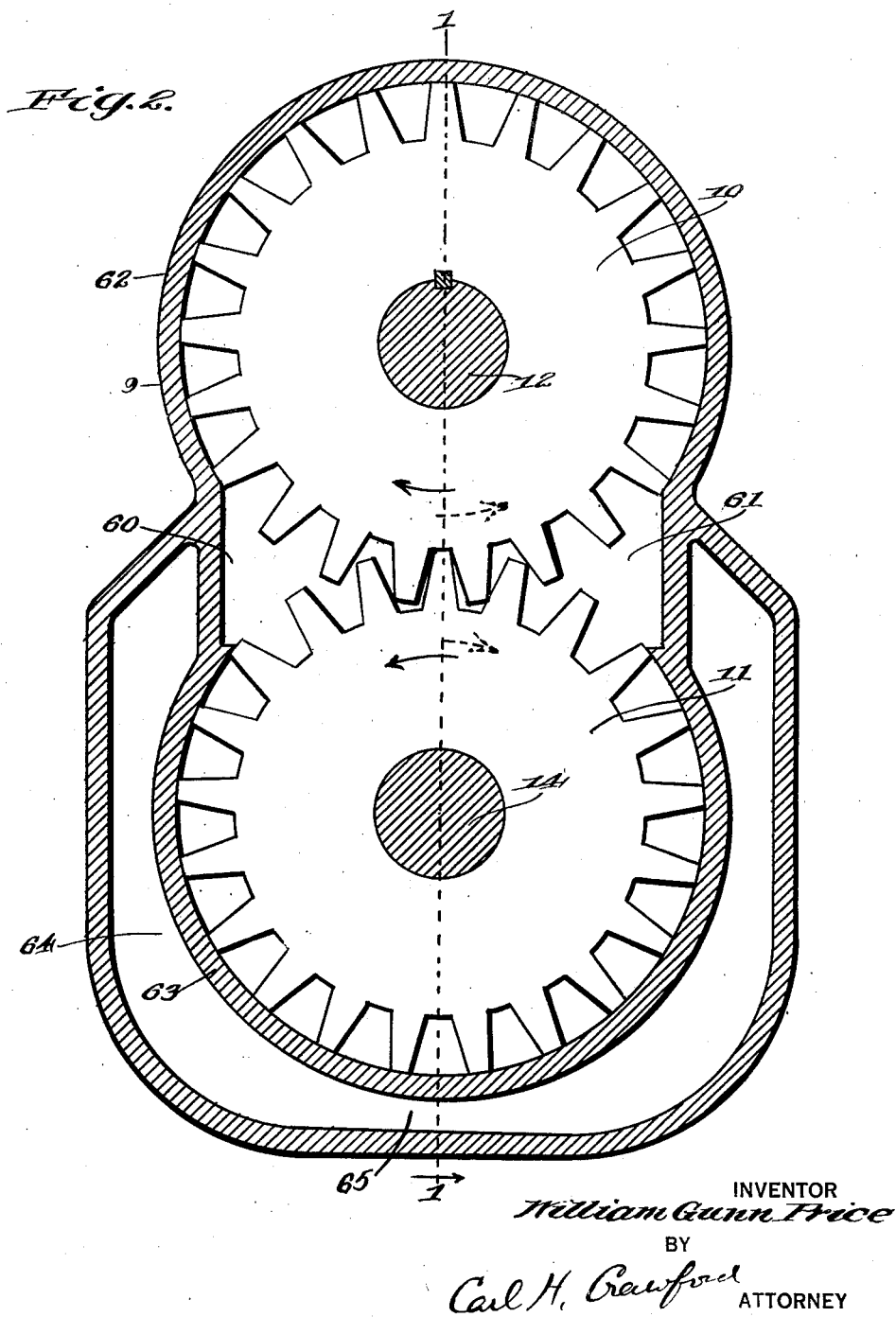
Fig. 2, is a vertical sectional view on line 2—2 of Fig. 1.

With the vehicle advancing, the gears 10 and 11, viewing Fig. 2, will be as indicated by the full line arrows and chamber 60, will be the induction chamber. With the controlling valve closed, as shown in Fig. 3, oil cannot enter at either ports 92 or 93. Now assuming that the valve 74 is elevated so that the free end 96 uncovers port 92, suction will open valve 94 and oil will flow through passage 90, into chamber 60, and the gears 10 and 11, will carry this oil over into chamber 61, which becomes the compression chamber. When congestion starts in chamber 61, oil will first seek egress through port 93 but will be shut off by valve 95, and will pass up extension 87 and open valve 89, and pass into chamber 83, through port 85. This oil will also pass into port 84, but valve 88, will prevent this oil from ingressing to extension 86. Hence, it will be clear that no oil can enter chamber 60, or either of the chambers that is acting as the induction chamber, when such oil has previously been egressed from the chamber acting as the compression chamber. Therefore as the braking application is now being applied, it is clear that the oil will seek escape, and such escape is offered through openings 82, of the controlling valve, dependent upon the position of said valve. In any event, such escaping oil will pass into the controlling valve portion 75, and downwardly to the oil supply, without any resistance. As valve 74, is elevated, to admit oil to port 92, the double V-shaped openings 82 will first cut down escape of oil at a relatively slow rate, and as the valve 74 is raised further and the V-portions 98 come into play, the rate of restriction will be more rapid, and the valve 74 will open ingress to 92 more rapidly. This gradual shut-off through openings 82, serves to prevent sudden shocks that would be imparted if the braking action were not effected gradually. Further, the elongated V-openings 82, afford a sufficient range of movement of the foot lever 24 so that while the latter is being advanced the driver can sense the extent of braking power applied by the action of the vehicle, which would not be true with a short opening.

It will now be clear, that as the valve 74, gradually or otherwise cuts off egress of the compressed oil, the pressure in chamber 61, will increase, and hence braking stress will be applied to the gears 10 and 11, and the shaft 12, thus arresting the vehicle wheels through the differential. This pressure is available through pipe 106, for trailer use, and through pipe 38, for band brake actuation. If the brake is so adjusted, the valve 74 can be elevated so that the openings 82 are elevated out of registry with chamber 83, in which event, the vehicle wheels will be locked.

After the vehicle has been arrested, or brought to a position of rest, and it is desired to release the hydraulic brake, the controlling valve is returned to the position shown in Fig. 3, thereby closing ingress to chamber 60, and releasing compression from chamber 61, through openings 82. The oil remaining in ports 84 and 85, will be trapped therein by closure of valve 89, and there may be a slight amount of oil remaining in extension 87, although the rapid rotation of the gears 10 and 11, will act to force most of this residue of oil upwardly past valve 89.

Suppose the car was on a hill and the engine was killed and the car started down hill, the gears would then be rotating in the direction of the dotted arrows and chamber 60, would then be the compression chamber. The same direction of movement would be imparted to lever 24, to apply brakage, that was imparted when the vehicle was advancing, and the valve 74, would be elevated in the same manner. Oil would pass through port 93, by reason of suction produced in chamber 61, opening valve 95, and such suction would tend to seat valve 89. The gears 10 and 11, would transfer the oil to chamber 60, which latter would then be the compression chamber, and the oil would fill extension 86, opening valve 88, and filling ports 84 and 85, and actuating to seat valve 89. The openings 82, would restrict egress of the compressed oil thereby increasing congestion in chamber 60 and imparting braking stress to gears 10 and 11. When valve 74, was returned to the normal position shown in Fig. 3, after sufficient braking stress had been applied, and the car was advanced, the gears 10 and 11, would start rotating in the direction of the full line arrows. This, would convey the oil from chamber 60, over to chamber 61, including the entire head of oil in extensions 86, and the oil would be thrust, by the rapidity of rotation of the gears up into extension 87, most of its passing by valve 89.

It will thus be seen that there always will be a small amount of oil remaining after restoration of valve 74 from a service to a non-service position but this will not be sufficient to amount to an appreciable drag. It is important to note that while I have provided a complete circuit for the oil, and always maintain a reservoir supply of oil, still, the main body of oil is never in motion through the circuit when the controlling valve 74 is in a non-service position, but is rather quiescent.

It will now be clear that my improved by-pass valve 106, is located in such an intimately responsive position with respect to chamber 83, that it will act, irrespective of the extent or purpose of the adjustment of valve 74, to prevent the oil from attaining a pressure beyond the maximum pressure considered desirable.

It is believed that my invention will be clearly understood from the foregoing description and I do not wish to be limited thereto except for such limitations as the claims may import.

I claim:

1. In combination, a motor vehicle having a hydraulic brake operating through the differential and provided with band brakes, pressure actuated means operated by pressure from said hydraulic brake for applying said band brakes, a valve means for controlling admission of pressure to said means, a brake treadle, and mechanism operatively connecting said treadle with said hydraulic brake and valve means to cause only hydraulic brake application when said treadle is moved to an initial position and to actuate said valve means when said treadle is moved to an intermediate position to also effect band brake application and to retain application of said band brakes when said treadle is moved to a final position.

2. In combination, a motor vehicle having a hydraulic brake operating through the differential and provided with band brakes, pressure actuated means operated by pressure in said hydraulic brake for applying said band brakes, and mechanism for applying hydraulic brakage alone, or applying band brakage in addition to and simultaneously with said hydraulic brakage to bring the vehicle to rest, and holding said band brakage applied after the vehicle has been brought to rest.

3. In combination, a motor vehicle provided with a hydraulic brake and a band brake, a band brake cylinder in pressure connection with said hydraulic brake and having a band brake operating piston, a spring closed valve controlling pressure admission to said cylinder, a treadle connected to operate said hydraulic brake and being movable from a rest into an initial, an intermediate and a final position, and a lost motion connection between said valve and treadle for opening said valve to apply band brakage on movement of said treadle to an intermediate position and close said valve to retain band brakage on movement of said treadle to a final position.

4. In combination, a motor vehicle provided with a hydraulic brake and a band brake in pressure operative relation with said hydraulic brake, and means movable to variously different positions for selectively operating said hydraulic brake and band brake.

5. In combination, a motor vehicle provided with a hydraulic brake and a band brake in pressure operative relation to said hydraulic brake, means for selectively moving said hydraulic and band brakes into operation, and means for limiting movement of said hydraulic brake toward an operative position beyond a predetermined extent.

6. In combination, a motor vehicle provided with a hydraulic brake provided with means for limiting its opening movement to a predetermined extent, a treadle flexibly connected with said hydraulic brake to operatively move the same and being movable beyond a hydraulic brake movement, a band brake for said vehicle, and mechanism connecting said band brake for operation by said treadle only after said hydraulic brake has been operatively moved.

7. In a hydraulic brake, a casing having opposed chambers adapted to act either as suction or compression chambers, vehicle driven gears having mesh engagement between said chambers for sucking oil into one chamber and compressing the oil into the remaining chamber dependent upon the direction of rotation of said gears, mechanism permitting suction ingress to and preventing pressure egress from said chambers, means for controlling movement of oil egressed from said chambers to apply braking stress to said gears, and means for preventing ingress of such controlled oil to that chamber acting as the suction chamber.

8. In a hydraulic brake, a casing having opposed chambers adapted to act either as suction or compression chambers, vehicle driven gears having mesh engagement between said chambers for sucking oil into one chamber and compressing the oil into the remaining chamber dependent upon the direction of rotation of said gears, a valve controlling passage of oil egressed from said chambers to apply braking stress to said gears, and means coacting with said valve for by-passing the controlled oil to prevent the application of more than a predetermined extent of braking stress to said gears.

9. In a hydraulic brake, a casing having opposed chambers, vehicle driven gears having mesh engagement between said chambers and causing either of said chambers to act as suction chambers dependent upon the direction of rotation of said gears, and a longitudinally movable slide valve having a portion for opening admission to said chambers and provided with a V-shaped egress for gradually closing egress of oil from said chambers.

10. In a hydraulic brake, a casing having opposed chambers, vehicle driven gears having mesh engagement between said chambers and causing said chambers to act as suction or compression chambers in accordance with the direction of rotation of said gears, and a longitudinally movable slide valve having a portion for opening admission to said chambers and provided with a V-shaped egress having a minor portion for a relatively lesser restriction and a major portion for a relatively greater restriction of the oil.

11. In a hydraulic brake, a casing provided with opposed chambers having a source of supply of oil to be compressed in one or the other, vehicle driven gears interposed between said chambers, and means for closing egress from the acting chamber at a gradually increasing rate with respect to the rate of closing movement of said means to prevent shock in applying braking stress.

12. In combination, a vehicle, a hydraulic brake mechanism therefor including vehicle driven gears and a casing enclosing said gears and forming a chamber on each side thereof, a valve device for controlling ingress to and egress from said chambers for applying braking stress, and non-return means between said chambers and the ingress thereto, and non-return means between said chambers and the egress therefrom.

13. In combination, a motor vehicle having a hydraulic brake operating through the differential and provided with band brakes, pressure actuated means operated from pressure built up by said hydraulic brake for applying said band brakes, and mechanism for causing hydraulic brakage alone or applying band brakage in addition to the hydraulic brakage.

In testimony that I claim the foregoing as my own, I hereby affix my signature.

WILLIAM GUNN PRICE.